C. DEMAUREZ.

Assignor to H. SOULE, D. W. SCHWARZ & C. S. COOK.

CAR COUPLING.

No. 11,265. Reissued Aug. 23, 1892.

Witnesses:
Chas. A. Mosley
James E. McDowell

Inventor:
Charles Demaurez
by S. M. Bates
his atty.

THE NORRIS PETERS CO., PHOTO-LITHO., WASHINGTON, D. C.

UNITED STATES PATENT OFFICE.

CHARLES DEMAUREZ, OF PORTLAND, MAINE, ASSIGNOR TO HENRY SOULE, DAVID W. SCHWARZ, AND CHARLES S. COOK, OF SAME PLACE.

CAR-COUPLING.

SPECIFICATION forming part of Reissued Letters Patent No. 11,265, dated August 23, 1892.

Original No. 466,713, dated January 5, 1892. Application for reissue filed April 15, 1892. Serial No. 429,371.

*To all whom it may concern:*

Be it known that I, CHARLES DEMAUREZ, of Portland, in the county of Cumberland and State of Maine, have invented certain new and useful Improvements in Car-Couplings; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
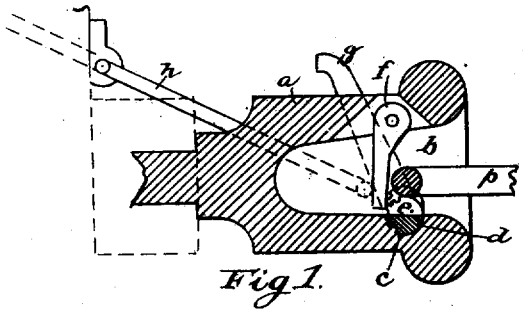
Figure 2:
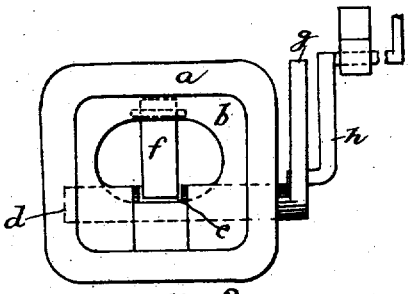
Figure 7:
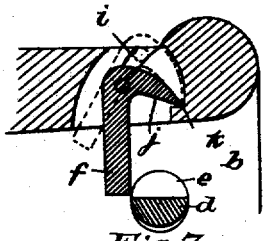
Figure 3:
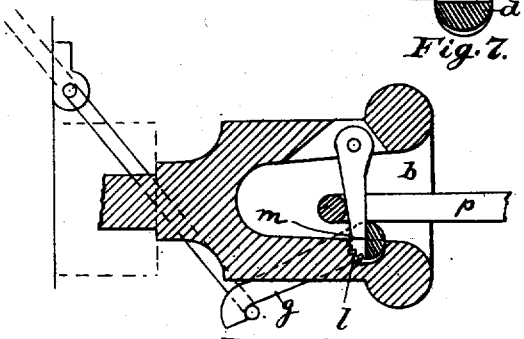
Figure 4:
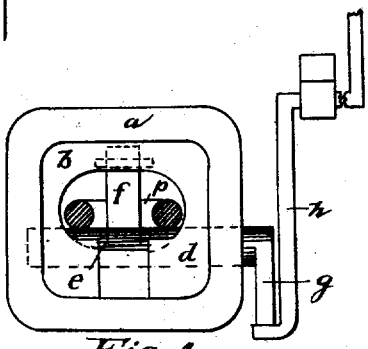
Figure 5:
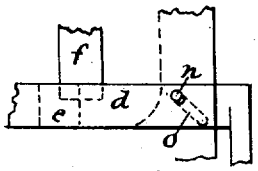
Figure 6:
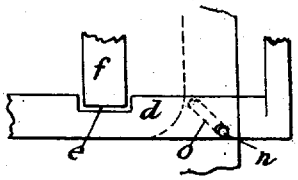

Figure 1 is a central longitudinal section showing the several parts in position to be uncoupled. Fig. 2 is an end view of the same. Fig. 3 is a central longitudinal section showing the parts in their normal positions. Fig. 4 is an end view of the same. Figs. 5 and 6 are detail views showing a different method of operating the cross-bar. Fig. 7 is a detail view showing the coupling-pin arranged to have a vertical movement.

The same letters refer to like parts.

My invention relates to car-couplers, and is specially designed to make an automatic coupler and to render it capable of being readily and easily uncoupled even while the link is drawn heavily against the coupling-pin. It consists of a draw-bar having an open end, a horizontal cross-bar adapted to revolve in vertically-elongated holes in the sides of said draw-bar and being vertically movable therein and having a portion removed or cut away at the center, and a pivoted coupling-pin adapted to engage with said cross-bar, and in other details of construction hereinafter more fully set forth and described.

In said drawings, *a* represents a draw-bar having the open end *b*, the outer part of which should be slightly flaring to more readily admit the link. In the sides of the draw-bar are two holes *c*, in which are inserted the ends of a cross-bar *d*, said cross-bar having a cut-away or recessed portion *e*. Pivoted in the top of the draw-bar is a pin *f*, adapted to swing back and forth and to engage the cross-bar *d*, except when it is turned, so that the recessed portion is on top, as shown in Fig. 3, but to swing freely when said recessed part is on top, and thus allow the link to be withdrawn. Attached to either end of said cross-bar are lever-arms *g*, which by force of gravity hold the cross-bar in position to engage the pin. Adapted to engage with said lever-arms *g* are pivoted levers *h*, which extend out to the sides of the car, so that the cars may be uncoupled without its being necessary to pass between them. It may also extend to the top of the car, so that they may be uncoupled from the top also.

To lessen the distance which the link must pass through to allow the pin to drop into it, I may use instead of a pin set on a stationary bar, as shown in Fig. 1, the arrangement shown in Fig. 7, wherein the pin is pivoted on a bar set loosely in a slot *i* and has a spur *j*, adapted to rest in a recess *k*, made in the draw-bar, so that when the link strikes the lower end of the pin, the pin at the same time that it is driven backward is also forced upward. By this arrangement the length of the coupling-link, and consequently the slack, is much lessened.

To enable the cross-bar to rise and fall for the purpose of engaging and releasing the lower end of the pin, I may make the holes *c* somewhat oval-shaped and have made in the side a series of cogs *l*, adapted to mesh with the cogs *m* on the cross-bar, so that the bar as it is turned in one direction will rise bodily in its bearings and engage the lower end of the pin, and when the lever-arm is raised to turn the bar to allow the link to uncouple the bar drops to the bottom of said oval holes, as seen in Fig. 1. It will be evident that however great the strain of the link against the pin the bar can be easily turned, since every part of the contact portion is being turned away from the pin. The amount of vertical movement in the bar will be regulated by the length of the oval-shaped holes.

In Figs. 5 and 6 the cross-bar is shown as adapted to have a sidewise movement, so that the recessed portion *e* may be carried beyond the line in which the pin swings, as shown by dotted lines in Fig. 5. This may be done in various ways, one of which is illustrated in said Figs. 5 and 6, wherein a spur *n* is set in the cross-bar and made to slide in an inclined slot or groove *o* in the draw-bar.

Having thus described my invention and its use, what I claim, and desire to secure by Letters Patent of the United States, is—

1. In a car-coupler, a draw-bar having an open end, a cross-bar journaled in oval-shaped holes in the sides of the draw-bar and having a recess therein, said oval openings having cogs at the side and said cross-bar having cogs to mesh therewith, and a link-pin pivoted in the top of the draw-bar, substantially as and for the purposes set forth.

2. In a car-coupler, a draw-bar having an open end, a cross-bar having a recess therein journaled in holes in the sides of the draw-bar, and a link-pin pivoted in a slot in the top of the draw-bar, said pin having a dog projecting forward and having its point resting in a recess in the draw-bar, substantially as and for the purposes set forth.

3. In a car-coupler, a draw-bar having an open end, a cross-bar journaled in oval-shaped or vertically-elongated holes in the sides of said draw-bar, said oval holes having cogs at the side and said cross-bar having cogs to mesh therewith, and a link-pin pivoted at the top of said draw-bar, substantially as described.

In testimony that I claim the foregoing as my own I affix my signature in presence of two witnesses.

CHARLES DEMAUREZ.

Witnesses:
D. W. SCHWARZ,
HENRY SOULE.